US 6,997,336 B2
(12) United States Patent
Yourist et al.

(10) Patent No.: US 6,997,336 B2
(45) Date of Patent: Feb. 14, 2006

(54) PLASTIC CAFARE

(75) Inventors: Sheldon Yourist, York, PA (US); John Denner, York, PA (US); Angie Noll, York, PA (US); Roger Prevot, Felton, PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 10/662,879

(22) Filed: Sep. 16, 2003

(65) Prior Publication Data

US 2004/0104195 A1 Jun. 3, 2004

Related U.S. Application Data

(63) Continuation-in-part of application No. 29/176,497, filed on Feb. 25, 2003, now Pat. No. Des. 488,060, and a continuation-in-part of application No. 29/176,498, filed on Feb. 25, 2003, now Pat. No. Des. 485,181.

(60) Provisional application No. 60/412,574, filed on Sep. 23, 2002.

(51) Int. Cl.
*B65D 1/02* (2006.01)
*B65D 23/00* (2006.01)
*B29C 35/02* (2006.01)
*B29C 35/16* (2006.01)

(52) U.S. Cl. .................... 215/379; 215/10; 215/40; 215/381; 215/384; 220/288; 264/521; 264/528; 264/535; 264/536

(58) Field of Classification Search ............... 215/10, 215/41, 42, 444, 206, 373, 381, 382, 384, 215/379, 4; 220/288; 264/521, 528, 535, 264/536
See application file for complete search history.

(56) References Cited

U.S. PATENT DOCUMENTS

| 2,641,374 | A |   | 6/1953  | Yuen |
|-----------|---|---|---------|------|
| 2,738,891 | A | * | 3/1956  | Pitto ............................ 215/10 |
| 2,788,161 | A | * | 4/1957  | Kemper ...................... 222/571 |
| D196,148  | S | * | 8/1963  | Sterges ........................ D9/539 |
| 3,229,841 | A | * | 1/1966  | Bailey .......................... 215/42 |
| 3,606,104 | A | * | 9/1971  | Rickmeier, Jr. ............. 222/498 |
| 3,784,040 | A | * | 1/1974  | Douglas ....................... 215/42 |
| 3,923,178 | A |   | 12/1975 | Welker, III |
| 4,117,946 | A | * | 10/1978 | Kessler ....................... 215/321 |
| 4,372,455 | A | * | 2/1983  | Cochran ..................... 215/385 |
| 4,496,064 | A |   | 1/1985  | Beck et al. |
| 4,618,515 | A |   | 10/1986 | Collette et al. |
| 4,665,682 | A |   | 5/1987  | Kerins et al. |
| 4,816,273 | A | * | 3/1989  | Smith et al. ................ 426/393 |
| 5,064,081 | A | * | 11/1991 | Hayashi et al. ............. 215/373 |
| 5,067,622 | A | * | 11/1991 | Garver et al. ............... 215/381 |
| 5,092,474 | A | * | 3/1992  | Leigner ....................... 215/381 |
| 5,222,615 | A | * | 6/1993  | Ota et al. .................... 215/375 |
| 5,224,614 | A |   | 7/1993  | Bono et al. |

(Continued)

FOREIGN PATENT DOCUMENTS

EP 0136222 A2 * 4/1985 ................. 215/42

(Continued)

*Primary Examiner*—Sue A. Weaver
(74) *Attorney, Agent, or Firm*—Venable LLP; James R. Burdett; Keith G. Haddaway

(57) ABSTRACT

A plastic carafe includes a body portion having an enclosed base defined by a plurality of upstanding posts and a plurality of panels separating the posts from one another. The carafe further includes a neck portion having a blown finish at the top of the carafe that defines a wide-mouth. A shoulder portion transitions the posts and panels to the neck portion.

40 Claims, 11 Drawing Sheets

U.S. PATENT DOCUMENTS

| | | | |
|---|---|---|---|
| 5,427,258 | A | 6/1995 | Krishnakumar et al. |
| 5,762,221 | A * | 6/1998 | Tobias et al. ................ 215/381 |
| 5,826,738 | A * | 10/1998 | Minh ......................... 215/206 |
| D401,154 | S * | 11/1998 | Robinson ..................... D9/528 |
| 5,887,739 | A | 3/1999 | Prevot et al. |
| 5,908,127 | A | 6/1999 | Weick et al. |
| D420,593 | S | 2/2000 | Denner et al. |
| 6,164,474 | A * | 12/2000 | Cheng et al. ............... 215/384 |
| 6,228,317 | B1 | 5/2001 | Smith et al. |
| 6,237,791 | B1 * | 5/2001 | Beck et al. ................ 215/379 |
| 6,264,050 | B1 * | 7/2001 | Darr et al. .................... 215/40 |
| 6,277,321 | B1 * | 8/2001 | Vailliencourt et al. ...... 264/529 |
| 6,349,844 | B1 * | 2/2002 | Betras ......................... 220/709 |
| D458,146 | S | 6/2002 | Sadeghi et al. |
| 2001/0035392 | A1 * | 11/2001 | Ota et al. |
| 2002/0153343 | A1 * | 10/2002 | Tobias et al. |
| 2004/0159626 | A1 | 8/2004 | Trude |

FOREIGN PATENT DOCUMENTS

| | | |
|---|---|---|
| EP | 0269066 | 6/1988 |
| WO | WO 89/07553 | 8/1989 |
| WO | WO 01/40081 | 6/2001 |

\* cited by examiner

PLASTIC CAFARE

CROSS-REFERENCES TO RELATED APPLICATIONS

The present application claims the benefit to U.S. Provisional Patent Application No. 60/412,574, filed Sep. 23, 2002 and entitled "Plastic Carafe" to John Denner, Sheldon E. Yourist and Angie C. Noll; and is a continuation-in-part of U.S. Design Application No. 29/176,497, filed Feb. 25, 2003, which was issued as U.S. Design Patent No. D488060, on Apr. 6, 2004 and entitled "Container" to Sheldon E. Yourist and U.S. Design Application No. 29/176,498, filed Feb. 25, 2003, which was issued as U.S. Design Patent No. D485181, on Jan. 13, 2004 and entitled "Container Closure" to Sheldon E. Yourist. The above-cited applications are of common assignee to the present invention, and the contents are incorporated herein by reference in their entirety.

BACKGROUND OF THE INVENTION

1. Field of the Invention

The present invention relates generally to wide-mouth blow-molded plastic containers, and more particularly to such containers that are not only suited for hot-fill applications, but also for applications in which not-from-concentrate chilled juices must be shelved for extended periods of time.

2. Related Art

In the manufacture of blow molded plastic bottles for containing liquids such as beverages, it is customary to utilize an injection-molded preform having a threaded finish which forms the threaded finish of the container blown from the preform. The preform may be injection molded from a variety of desirable plastic materials, with a currently particularly preferred material being polyethylene terephythalate (PET).

In hot-fill applications, i.e., applications where the blown container is filled with a liquid at a temperature in excess of 180° F. (82° C.), capped immediately after filling, and allowed to cool to ambient temperatures, vacuum absorption panels are generally provided in the body of the container to accommodate vacuum induced shrinkage resulting from the cooling of the container contents. In such containers, the injection molded threaded finish undergoes a minimal amount of distortion in the hot-fill process. Hot-fill containers molded of PET by this technique have found widespread acceptance in the marketplace.

For quite some time, there has been a need in the marketplace for a so-called wide-mouth container for hot-fill applications. A wide-mouth container enables the consumer to scoop-out contents which are not readily flowable. In the early 1980's, attempts were made to produce hot-fillable PET containers having wide-mouths. Manufacturing technique and resulting containers are disclosed in U.S. Pat. Nos. 4,496,064; 4,618,515; and 4,665,682.

For reasons not fully known, these wide-mouth containers were not successful in the marketplace. There is a current need for a hot-fillable wide-mouth container, which is particularly suited for packaging viscous products, such as applesauce and the like. Moreover, there is a current need for a cold-fillable wide-mouth container for packaging not-from-concentrate chilled juices, which must be shelved for extended periods of time.

Traditionally, "not-from-concentrate chilled juices" (i.e., juices which are flash-heated to pasteurize them immediately after the fruit is squeezed) have been contained in paper cartons or glass containers and are usually found in the dairy section of grocery stores. Certain manufacturers have more recently packed such not-from-concentrate chilled juices in 1.75-liter (59-oz) PET containers shaped like carafes. For example, the Simply Orange™ (a trademark of the Coca-Cola Company, Atlanta, Ga.) not-from-concentrate chilled orange juice has been packaged in an injection/stretch blow molded container manufactured in a two-stage process by Schmalbach-Lubeca Plastic Containers.

Typically, a "carafe" is a wide-mouth bottle that is used for serving wine, water or other beverages. The Simply Orange™ carafe, however, comprises a narrow-mouth, injection-molded finish with a cap configured to look like a wide-mouth carafe. Similar containers have been manufactured for the dairy industry, including by the assignee of the present invention. It would be desirable, therefore, to provide a wide-mouth container for not-from-concentrate chilled juices and the like, which is truly a carafe and is also adapted for cold-fill applications.

A particularly persistent problem in the manufacture of plastic containers is known in the industry as "lightweighting." Typically, lightweighting involves redesigning a package to use less plastic material, which also tends to make it weigh less. Manufacturers continue to develop new technologies that enable them to reduce the amount of PET resin needed to make a bottle without compromising performance. These efforts are extremely important in reducing manufacturing costs because PET resin accounts for a significant portion of the cost of a finished bottle. Accordingly, it would be desirable to provide a wide-mouth plastic container for not-from-concentrate chilled juices and the like, which is a true carafe, is adapted for cold-fill applications, and is lighter than similar packages known in the prior art.

SUMMARY OF THE INVENTION

With the foregoing in mind, an object of the present invention is to provide a commercially satisfactory wide-mouth blow-molded plastic container, which is particularly suited for viscous fluid hot-fill applications.

Another object of the present invention is to provide a suitable wide-mouth blown plastic container, which has a blown finish that resists distortion resulting from hot-fill processing.

Yet another object of the present invention is to provide a suitable wide-mouth blown plastic container, which is also particularly suited for cold-fill applications such as not-from-concentrate chilled juices and the like.

A further object of the present invention is to provide a method of manufacturing a wide-mouth container, and a preform, which enables commercially acceptable hot-fillable wide-mouth plastic containers to be produced by high speed manufacturing equipment in a manner that ensures consistent quality and performance.

In the present invention, a preheated preform is disposed in a mold cavity having a particular surface configuration which enables an intermediate container article to be severed at a precise location. The moil design cooperates with the preform to ensure the accurate placement of desirably-thick crystallized material in the blown threaded finish. It also produces an inturned flange on the inside of the blown threaded finish. The moil portion is severed by rotating the intermediate article relative to an elongate cutter as the intermediate article advances. The preform has regions of varying thickness along its wall to provide desired material thicknesses at preselected locations in the wall of the resulting container. Preform pre-heat and mold temperatures are controlled for achieving the desired hot-fillable container. Also, bayalage cooling can be utilized in the region of the blown threaded finish to prevent material shrink-back and to achieve the desired distortion resistance. One suitable form of such bayalage cooling is described in U.S. Pat. No. 6,228,317, which is of common assignee to the present invention, and is incorporated herein by reference in its entirety.

The plastic carafe of the present invention has a body portion with an enclosed base defined by a plurality of upstanding posts and a plurality of panels. Each of the panels separate one of the posts from one another. A neck portion having a blown finish at the top of the carafe defines a wide-mouth, and a shoulder transitions each of the posts and panels to the neck portion. The neck portion preferably includes a plurality of inwardly extending grooves that are adapted to increase top load capacity, to provide an anti-ovalization function, and to provide vacuum absorption when the carafe has been filled, capped, and allowed to cool to ambient temperatures.

One distinct advantage of the containers according to the present invention is that they may also be used in cold-fill, not-from-concentrate chilled juice applications. In contrast to prior art attempts at similar containers, the container resulting from the present invention is a true widemouth carafe, in that it comprises a wide-mouth container. The wide-mouth finish of such a container is blown, instead of injection-molded, as in the prior art.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF AN EXEMPLARY EMBODIMENT OF THE PRESENT INVENTION

Figure 1:
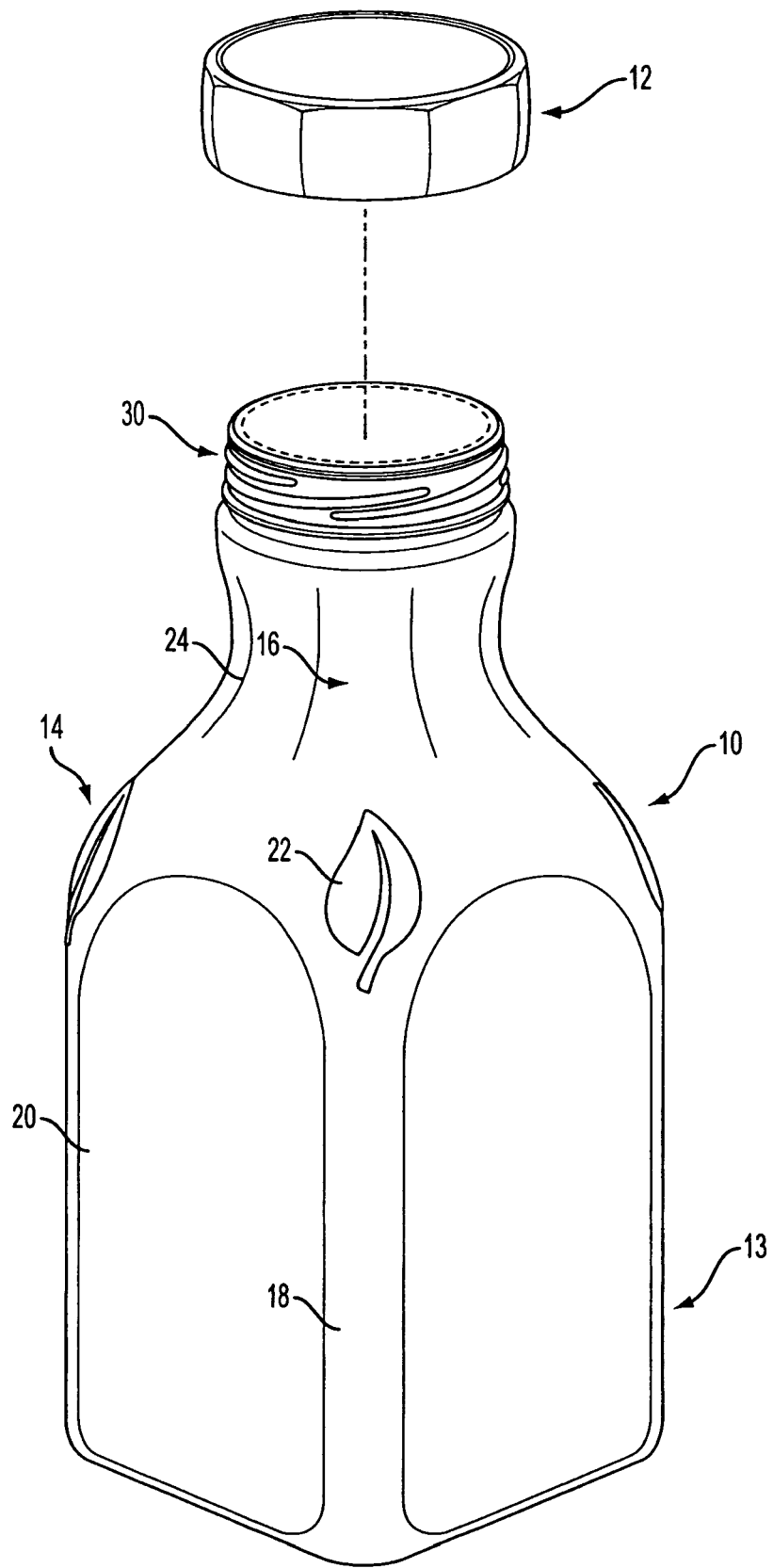
FIG. 1 is a perspective view of the plastic carafe and closure in accordance with the present invention.

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Referring now to the drawings, FIGS. 1–6 show a plastic carafe 10 according to a first embodiment of the present invention. Carafe 10 includes a wide-mouth threaded finish 30, unlike plastic "carafes" according to the prior art. A wide-mouth finish is defined as a finish having an outside diameter greater than is currently considered acceptable, achievable or typical for the given container volume. The advantage of a wide-mouth finish is that it affords ingress into the interior of the container to enable a consumer to scoop out viscous contents, such as applesauce and the like. In one embodiment of the carafe 10 according to the present invention, the finish 30 has an outside diameter of about 2.5 inches, particularly about 2.48 inches. Generally, the wide-mouth finish is about 2.0 inches or greater in diameter for a volume of about 1.75 L.

Figure 7:
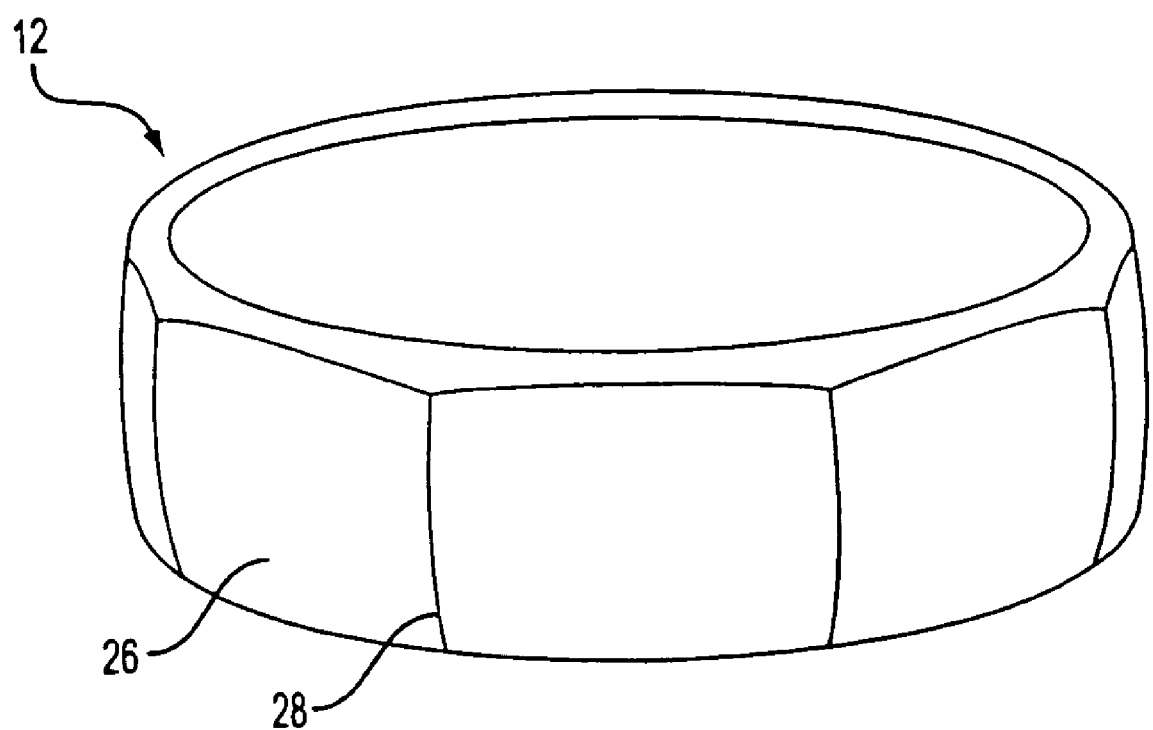
FIG. 7 is an enlarged perspective view of the carafe closure shown in FIG. 1.

The present invention also includes a closure 12 for the wide-mouth finish of the carafe, shown in more detail in FIG. 7.

Carafe 10 can be made from a preform (not shown). The preform can be injection molded of polyethylene terephythalate (PET), which is a copolyester resin having a crystalline peak melting point of less than 235° C., preferably about 234° C. (as contrasted with a 245° C. resin used in conventional hot-fill PET containers) and with corresponding lower crystallization rates. The resulting container can be characterized by a haze value in the region below the blown finish 30 of less than 1.0 as measured by a Hunter Labs, Color Quest 2 spectrophotometer.

Carafe 10 generally comprises a body portion 13 having an enclosed base, a shoulder portion 14, and a neck portion 16. Body portion 13 is generally square-shaped in horizontal cross section and defined by a plurality of posts 18 at each corner. Each post 18 is separated from the other by a panel 20, which may comprise a vacuum panel or not. Such vacuum panels may be designed to accommodate vacuum-induced volumetric shrinkage and support a label. The panels 20 can be flat or curved inwardly or outwardly. If the panels 20 are curved inwardly, handling of the filled container is improved by reducing bottle deformation and product level change, particularly during the initial opening and pouring of the container. The carafe 10 can also include a push-up base 34 at the bottom of the carafe 10. The push-up base is discussed in more detail below.

In an exemplary embodiment, the body portion 13 has an enclosed base and the plurality of upstanding posts 18 are substantially flat. Each of the plurality of panels 20 separates the posts from one another. Each post 18 is joined to the adjacent panel 20 by a rounded corner 19. The carafe 10 of this exemplary embodiment can also include a flared neck portion 16 having a blown finish and a wide mouth 30. A shoulder portion 14 transitions the posts 18 and panels 20 into the neck portion 16.

The neck portion 16 of the carafe according to the present invention can include a plurality of inwardly extending grooves 24, which cooperate to resist top loads, provide an antiovalization function, and provide a small measure of vacuum absorption when the container has been hot-filled, capped, and allowed to cool to ambient temperatures. Grooves 24 also provide similar such top load resistance and antiovalization function for cold-fill applications. The grooves can be vertical, as shown in the Figures, or horizontal, as disclosed in U.S. Pat. No. 5,887,739, incorporated herein by reference.

Figure 4:
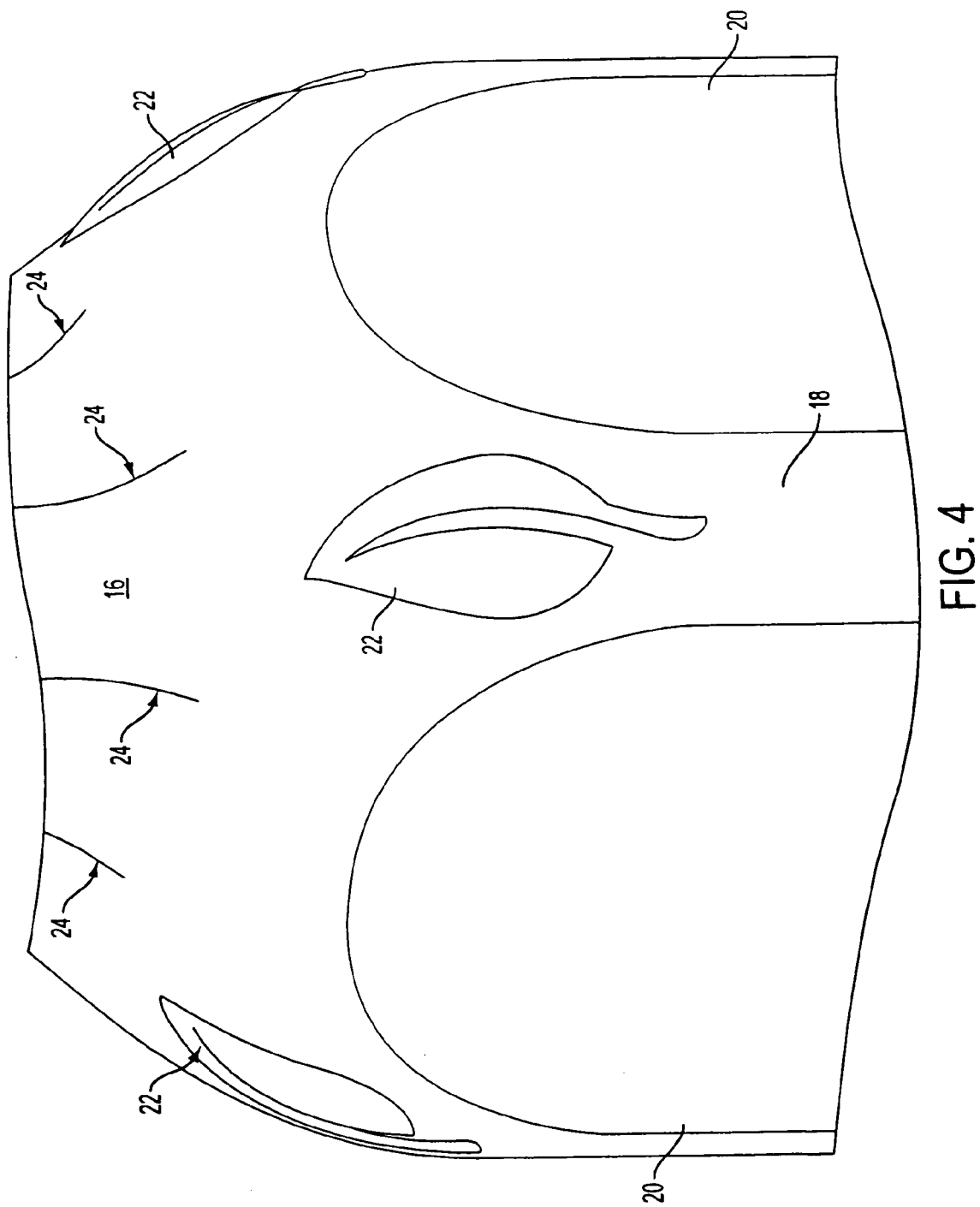
FIG. 4 is an enlarged sectional view of the plastic carafe shown in FIG. 1.
Figure 5:
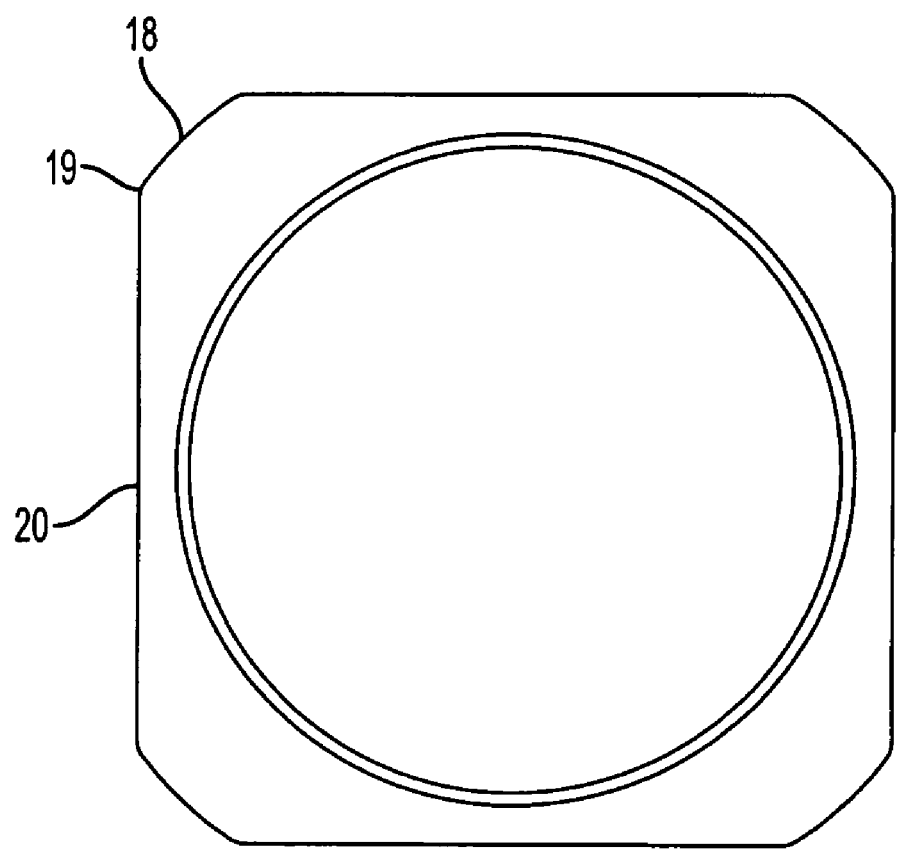
FIG. 5 is a bottom view of the plastic carafe shown in FIG. 1.

Carafe 10 can optionally further comprise a plurality of ornamental design features 22 at the corners of the carafe 10 in the vicinity of the shoulder portion 14. FIG. 4 shows an enlarged view of the shoulder portion 14 and a "single leaf" ornamental design 22 of the first embodiment.

In an exemplary embodiment, the carafe 10 has a height of about 10 inches, particularly about 9.861 inches. The body portion 13 has a height of about 6 inches, particularly about 5.778 inches, and a width of about 4 inches, particularly about 4.067 inches. The label area width on each side of the body portion is about 2.8 inches, particularly about 2.829 inches. The height of the neck and shoulder portion is about 3.4 inches, particularly about 3.357 inches. The height of the threaded portion and corresponding closure is about 0.7 inches, particularly about 0.726 inches. As will be appreciated by persons skilled in the art, these dimensions are non-limiting and adaptable depending on use or application.

The carafe 10 can hold about 1.75 L of product with an overflow capacity of about 1.815 L and weigh about 55–75 grams, particularly about 65 grams. The carafe 10 is designed to withstand a top load of at least 40 lbs.

Figure 6:
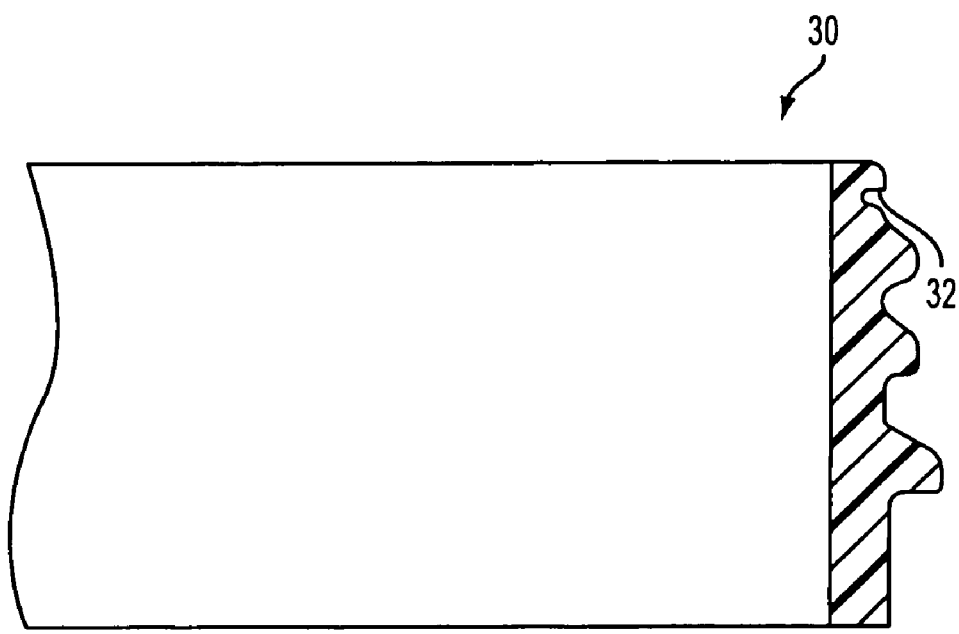
FIG. 6 is an enlarged section view of the closure mating mechanism of the plastic carafe shown in FIG. 1.

Referring now to FIG. 6, further details of the carafe 10 are shown. The blown finish 30 of the carafe 10 can have four leads spaced 90° apart, 120° full turn of thread, and a 0.142 pitch with seven threads per inch.

The finish can also include a "no-drip" finish 32. The no-drip finish includes a slight undercut at the top of the finish that breaks the surface tension of the product to prevent dripping or spillage of residual liquid after pouring. The no-drip finish 32 also provides a stiffening function to make the finish more resistant to distortion and ovalization while increasing the ability to lightweight because of the improved stiffening.

The closure 12, as shown in FIG. 7, is adapted to be screwed on the finish 30 of the carafe 10, and includes a plurality of ornamental design features 26 and 28 which mimic a similar theme to that evoked by the plurality of inwardly extending grooves 24.

Figure 2:
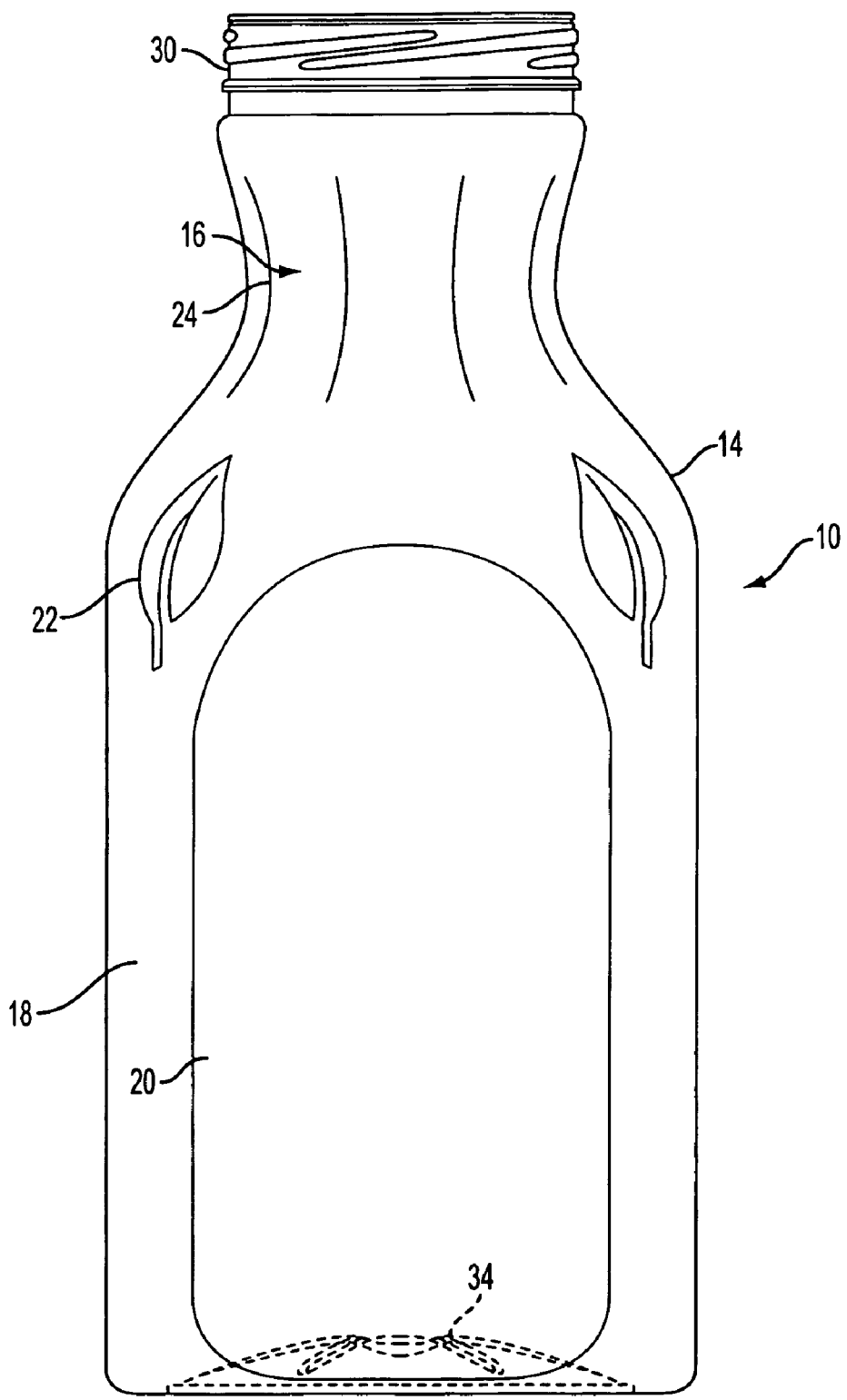
FIG. 2 is a side view of the plastic carafe shown in FIG. 1.
Figure 3:
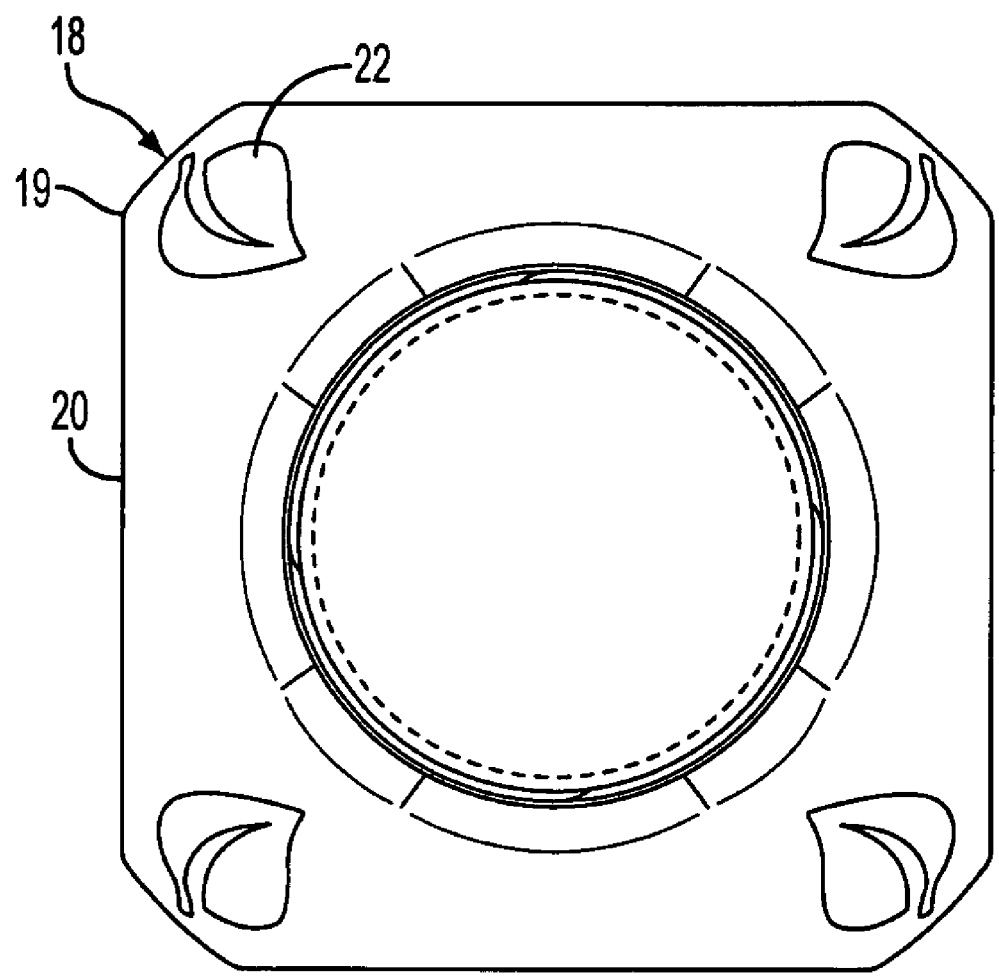
FIG. 3 is a top view of the plastic carafe shown in FIG. 1.
Figure 8:
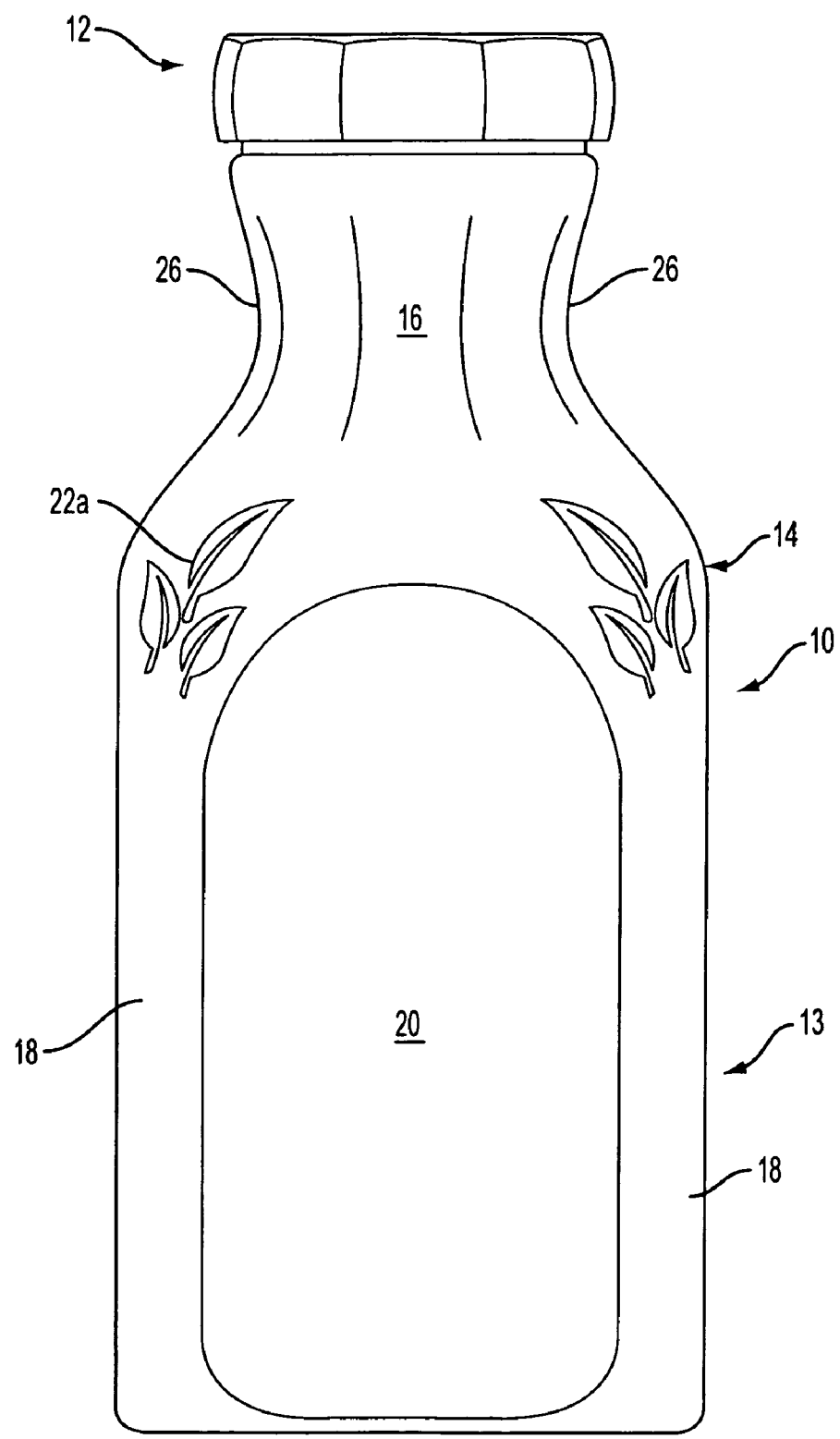
FIG. 8 is a side view of an alternate embodiment of the plastic carafe according to the present invention.
Figure 9:
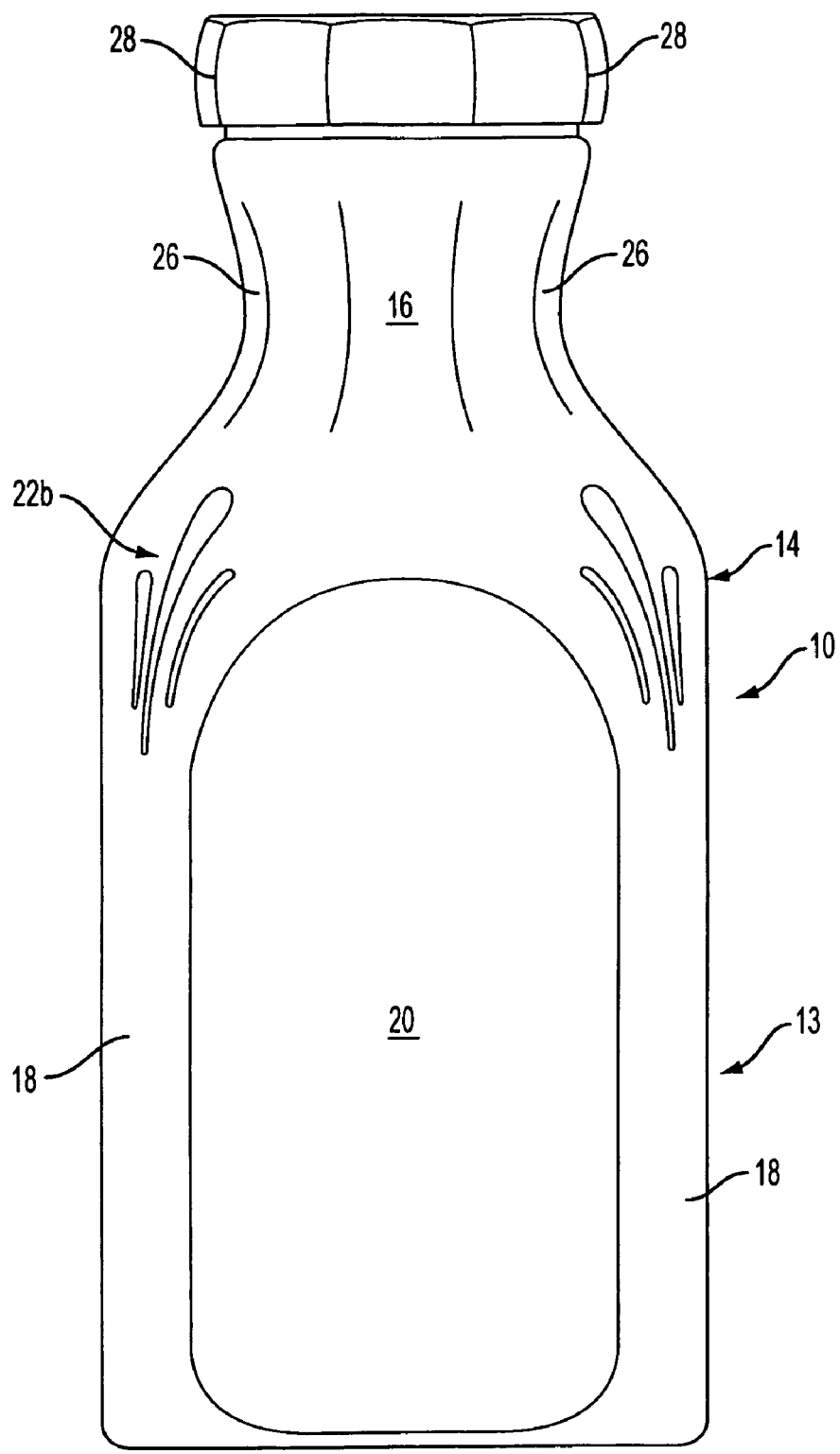
FIG. 9 is a side view of another alternate embodiment of the plastic carafe according to the present invention.

FIGS. 8 and 9 illustrate alternative embodiments of the carafe 10 according to the present invention. In particular, FIGS. 8 and 9 show ornamental design features 22a and 22b, respectively, different from that shown in FIGS. 1–4. FIG. 8 shows one carafe 10 with a plurality of ornamental design features 22a, while FIG. 9 shows another carafe 10 with a plurality of ornamental design features 22b. In both instances, the carafes 10 preferably comprise a wide-mouth blown finish 30 as shown in FIGS. 1–3.

Containers are subjected to varying internal pressures and volumetric changes (depending on the filling process used). Without structural support, the filling process, particularly a hot-filled process, can cause plastic containers to distort in a commercially-unacceptable manner. Improved base construction can prevent the base of the carafe from undergoing deflection or distortion. These improved bases typically include, at least, a standing ring and a central concavity, known as a push-up, to prevent distortion.

It is also advantageous if a number of carafes can be stacked to provide a stable stack having a greater resistance to being tilted. The presence of a standing ring and a push-up base may reduce the carafe's stackability because there is not as a large surface area in the base of the carafe to make contact with another carafe.

Stackability may be further reduced if the carafe has an upper end or closure or the like that also fails to provide a sufficiently large surface area to mate with the base of another carafe. In such an arrangement, although the carafes are stackable, they are not likely to be capable of being tilted. To improve the tiltability of such a stack, the base of the carafe, more particularly, the portion of the stacking ring that mates with closure of another container can be contoured so as to straddle a closure of another container. As used herein, the phrase straddle is intended to include essentially any straddling engagement, i.e., surface area engagement.

Figures 10A, 10B, 10C:
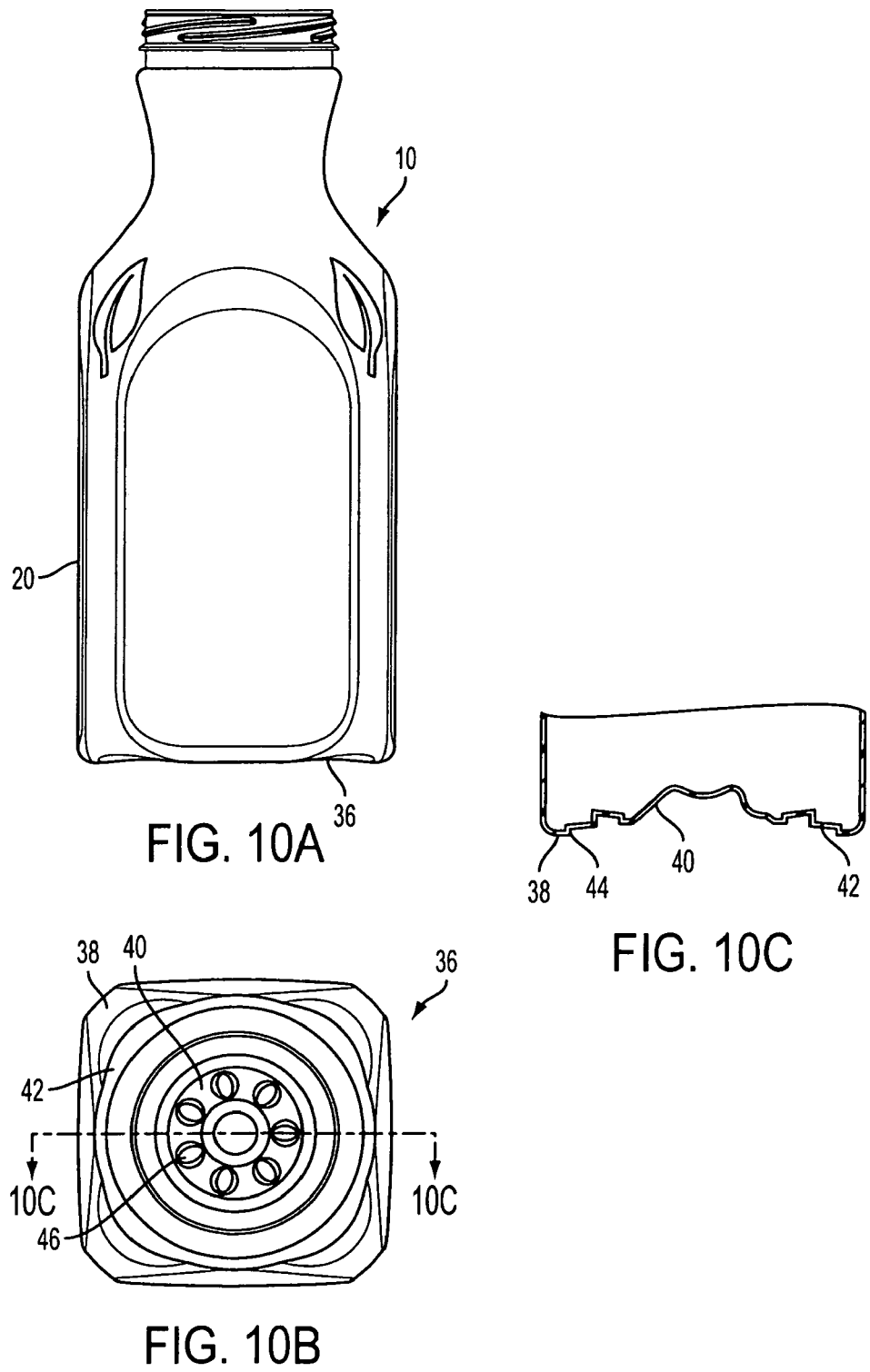
FIG. 10A is a side view of an additional embodiment of the plastic carafe according to the present invention.
FIG. 10B is a bottom view of the plastic carafe shown in FIG. 10A.
FIG. 10C is a cross sectional view of the plastic carafe shown in FIG. 10B along line 10C—10C.

As shown in FIGS. 10A–10C, the carafe 10 can include a base 36 adapted to receive a corresponding closure. Base 36 can have standing surface 38 for contact with a horizontal surface (not shown) on which the container can rest. Base 36 can also have bottom wall 40 defining a central concavity known as the push-up. Stacking ring 42 can be interposed between standing surface 38 and bottom wall 40. Stacking ring 42 can be a continuous ring, but in another exemplary embodiment, the stacking ring need not be complete and may have gaps (not shown).

Standing surface 38 is connected to stacking ring 42 by wall 44. In an exemplary embodiment, at least a wall 44 can be vertical, i.e., substantially parallel to panel 20. The push-up can have a plurality of support ribs 46 extending radically from the central concavity. Support ribs 46 can have a base disposed upwardly into the central concavity and an apex disposed downwardly towards stacking ring 42.

As shown in FIG. 10B, support ribs 46 can have an oval shape. In an alternative, support ribs 46 can have a pyramidal or trapezoidal shape. In yet an alternative exemplary embodiment, the push-up does not include support ribs 46. This and other exemplary embodiments of base 36 are shown in U.S. Published patent application No. 2004-0159626A1, published on Aug. 19, 2004, which is incorporated herein by reference in its entirety and is assigned to the assignee of the present invention.

Figure 11:
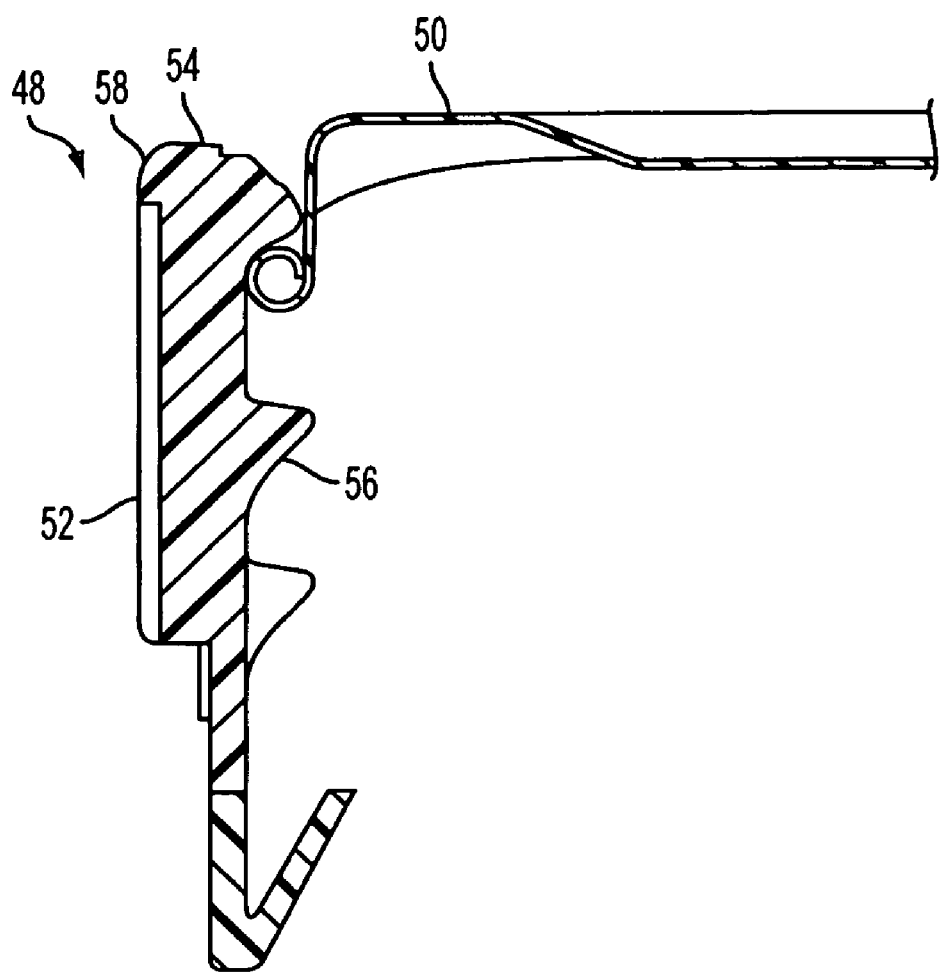
FIG. 11 is a partial, cross-sectional view of an alternate embodiment of a closure in accordance with the present invention and utilized with the plastic carafe of FIGS. 10A–10C.

The stacking ring 42 is designed to mate a corresponding closure to provide the desired stackability and tiltability. As shown in FIG. 11, one such closure 48 can be a two-part closure. Closure 48 can have inner disc portion 50 and a ring 52 with a peripheral wall 58. In this embodiment, a protrusion 54 can be formed on ring 52. In another embodiment, a protrusion can be formed on inner disc portion 50. In either embodiment, ring 52 can have internal threads 56 to threadedly engage a finish of another container. Closure 48 can mate with stacking ring 42 by aligning protrusion 48 with stacking ring 42. In such a mating engagement, the stacking ring 42 of container 10 can straddle the protrusion 54 of closure 48. Specifically, standing surface 38 can surround partially peripheral wall 58 of closure 48.

In a further exemplary embodiment, closure 48 can be one contiguous piece, such as a press-fit or screw-on lid or the like, similar to closure 12 in FIGS. 1 and 7, and a protrusion can be formed as a peripheral ring around closure.

In accordance with one embodiment of the invention, carafe 10 can be manufactured according to the methods disclosed in U.S. Pat. No. 6,228,317, which is commonly assigned to the assignee of the present invention and is incorporated herein by reference.

To manufacture carafe 10, a pre-heated preform is blow molded in a mold cavity to form an intermediate container article. The mold cavity has a surface with a container body region, a thread forming region superadjacent the body forming region, and a moil forming region superadjacent the thread forming region. The container body region of the mold cavity includes a base section, a shoulder portion and a neck portion. The base portion of the mold cavity is generally square shaped and includes a plurality of alternating upstanding posts and panels. The thread region of the mold cavity defines a wide mouth. The intermediate container article is formed with a moil portion that is subsequently severed to produce the carafe 10.

The method of manufacture of the carafe 10 reduces or eliminates distortion of the blown container finish due to hot-fill processing, which is common in conventional wide-mouth containers. Distortion is undesirable because a distorted threaded finish does not function well with the automatic cap tightening equipment and does not ensure seal integrity after the cap has been applied.

This method of manufacture advantageously results in a blown finish, such as finish 30 shown in FIGS. 1–6. The blown finish provides for an oriented closure to the carafe, i.e., features on the closure can be oriented to the features on the carafe. This is shown, for example, in FIGS. 8 and 9, wherein the ribs 28 on the closure 12 generally align with the ribs 24 on the neck 16. Other oriented features can be provided. For example, printed or embossed features on the closure can be provided to always align with similar features on the carafe. This results in added readability on a store shelf. Current manufacturing technology does not enable a satisfactorily oriented finish with an injected finish preform. The threads for the container are those formed on the preform during the first stage of the manufacturing process. In the second stage, blow molding the container, the position of the threads on the preform is random with respect to the position of the rotational mold. Orienting the finish of injected preforms requires costly machine upgrades to assure proper thread alignment. In contrast, the resulting blown finish of the present invention achieves much higher orientation tolerances as compared with the preform finishes. Particularly, the present invention enables a precise thread orientation in a single stage manufacturing process that results in the improved orientation of the closure with the container described above.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A plastic carafe having a top and a bottom, comprising:
a body portion having an enclosed base and defined by a plurality of upstanding substantially flat posts and a plurality of adjacent panels, each of the plurality of panels separating one of the plurality of posts from one another and each of said posts joined to the adjacent panel by a rounded corner;
a flared neck portion having a blown finish and defining a wide mouth; and
a shoulder portion transitioning each of said posts and said panels to said neck portion.

2. The plastic carafe according to claim 1, wherein the neck portion includes a plurality of inwardly extending grooves.

3. The plastic carafe according to claim 2, wherein each of the grooves are adapted to increase top load capacity, to provide an antiovalization function, and to provide vacuum absorption when the carafe has been filled, capped, and allowed to cool to ambient temperatures.

4. The plastic carafe according to claim 1, wherein the neck portion includes a plurality of outwardly extending grooves.

5. The plastic carafe according to claim 1, wherein the neck portion includes a combination of inwardly and outwardly extending grooves.

6. The plastic carafe according to claim 1, wherein the wide mouth is circular with an outside diameter of at least two inches.

7. The plastic carafe according to claim 6, wherein the outside diameter is about 2.5 inches.

8. The plastic carafe according to claim 6, wherein the outside diameter is greater than typical for a predetermined volume.

9. The plastic carafe according to claim 1, wherein the shoulder portion includes at least one ornamental design feature on an exterior surface of the carafe.

10. The plastic carafe according to claim 1, wherein the shoulder portion is free from any ornamental design features on an exterior surface of the carafe.

11. The plastic carafe according to claim 1, wherein the body portion includes four upstanding posts and four panels.

12. The plastic carafe according to claim 1, wherein the body portion, the neck portion, and the shoulder portion together define an interior space of about 1.75 liters.

13. The plastic carafe according to claim 12, wherein the body portion, the neck portion, and the shoulder portion have a weight of about 65 grams.

14. The plastic carafe according to claim 1, wherein the body portion, neck portion, and shoulder portion are adapted for hot-fill applications.

15. The plastic carafe according to claim 1, wherein the body portion, neck portion, and shoulder portion are adapted for cold-fill applications.

16. The plastic carafe according to claim 1, wherein the body portion, neck portion, and shoulder portion comprise polyethylene terephythalate having a crystalline peak melting point of less than 235° C.

17. The plastic carafe according to claim 1, wherein each of the plurality of panels includes at least one vacuum panel.

18. The plastic carafe of claim 1, wherein the base is a push-up base.

19. The plastic carafe according to claim 1, wherein the finish has an undercut approximately at the top of the carafe to provide for a no drip finish.

20. The plastic carafe according to claim 19, wherein the undercut is adapted to provide the finish with increased stiffness, an antiovalization function, and an increased light-weighting ability.

21. The plastic carafe according to claim 1, wherein the plurality of panels are inwardly curved to increase handling of the carafe.

22. A system for containing liquids, comprising:
a plastic carafe having a top and a bottom, the carafe comprising
a body portion having an enclosed base and defined by a plurality of upstanding substantially flat posts and a plurality of adjacent panels, each of the plurality of panels separating one of the plurality of posts from one another and each of said posts joined to the adjacent panel by a rounded corner; a flared neck portion having a blown finish and defining a wide mouth; and a shoulder transitioning each of said posts and said panels to said neck portion; and a closure adapted to engage the wide mouth and seal the carafe.

23. The system according to claim 22, wherein the wide mouth is circular with an outside diameter of at least two inches.

24. The plastic carafe according to claim 22, wherein the wide mouth is circular with an outside diameter that is greater than typical for a predetermined volume.

25. The system according to claim 22, wherein the body portion, the neck portion and the shoulder portion together define an interior space of about 1.75 liters.

26. The system according to claim 22, wherein the neck portion includes a plurality of inwardly extending grooves.

27. The system according to claim 22, wherein the closure is a first closure, the body includes a base at the bottom, and the base is contoured to engage at least a portion of a protrusion on a second closure.

28. The system according to claim 27, wherein the protrusion defines a peripheral ring.

29. The system according to claim 27, wherein the second closure further comprises an outer ring portion and an inner disc portion, the protrusion being formed on the outer ring portion.

30. The system according to claim 27, wherein the second closure is a press-fit lid.

31. The system according to claim 27, wherein the second closure is attachable to a second container.

32. The system according to claim 27, wherein the base of the container straddles the protrusion of the second closure.

33. The system according to claim 27, wherein the base further comprises:
a standing surface having an outer portion and an inner portion, the outer portion merging with one of the posts and panels;
a bottom wall defining a central concavity surrounded by the standing surface; and
a stacking ring interposed between the inner portion of the standing surface and the bottom wall operative to engage the portion of the protrusion of the second closure.

34. The system according to claim 33, wherein the bottom wall of the base further comprises a plurality of external ribs having an external rib base disposed upwardly into the central concavity and an external rib apex disposed downwardly towards the stacking ring.

35. The system according to claim 27, wherein the first and second closures are identical.

36. The system according to claim 27, wherein the finish and the closure provide an oriented closure of the carafe and closure.

37. The system according to claim 36, wherein the oriented closure provides at least one feature of the closure that corresponds and aligns with at least one feature of the carafe.

38. A method of making a blow-molded PET carafe container having an externally-threaded wide mouth finish for receiving a removable closure, comprising the steps of:
disposing a preform in a mold cavity having a mold surface with a container body region, and a moil forming region superadjacent said container body region,
said container body region configured to form the container, wherein the container comprises a body portion having an enclosed base and defined by a plurality of upstanding substantially flat posts and a plurality of adjacent panels, each of the plurality of panels separating one of the plurality of posts from one another and each of said posts joined to the adjacent panel by a rounded corner; a flared neck portion having an externally-threaded blown finish and defining a wide mouth; and a shoulder portion transitioning each of said posts and said panels to said neck portion,
distending said preform against said mold surface to form an intermediate container article having a moil portion superadjacent a threaded portion; and
severing said moil portion to produce the wide mouth carafe container.

39. The method according to claim 38, wherein the wide mouth has an outer diameter of at least two inches.

40. The plastic carafe according to claim 38, wherein the wide mouth has an outside diameter that is greater than typical for a predetermined volume.

* * * * *

UNITED STATES PATENT AND TRADEMARK OFFICE
CERTIFICATE OF CORRECTION

PATENT NO. : 6,997,336 B2 Page 1 of 1
APPLICATION NO. : 10/662879
DATED : February 14, 2006
INVENTOR(S) : Sheldon Yourist et al.

It is certified that error appears in the above-identified patent and that said Letters Patent is hereby corrected as shown below:

On the title page item (54), and col. 1, line 1, should read (54) -- PLASTIC CARAFE --

Signed and Sealed this

Eighteenth Day of July, 2006

JON W. DUDAS
*Director of the United States Patent and Trademark Office*